Figure 1:
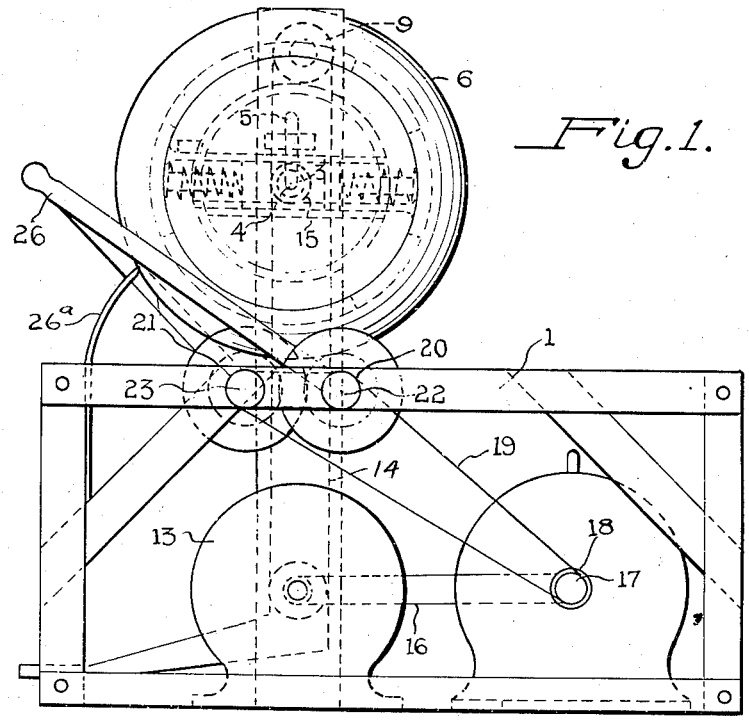

Dec. 22, 1936.    J. A. GEORGE    2,065,448
TIRE TRIMMING DEVICE
Filed Feb. 10, 1936    2 Sheets—Sheet 1

INVENTOR.
James A. George
By William B. Jasper
ATTORNEY.

Dec. 22, 1936.  J. A. GEORGE  2,065,448
TIRE TRIMMING DEVICE
Filed Feb. 10, 1936  2 Sheets—Sheet 2

INVENTOR.
James A. George
by William B. Jaspert
ATTORNEY.

Patented Dec. 22, 1936

2,065,448

UNITED STATES PATENT OFFICE 2,065,448

TIRE TRIMMING DEVICE

James A. George, Brackenridge, Pa.

Application February 10, 1936, Serial No. 63,207

4 Claims. (Cl. 82—1)

This invention relates to new and useful improvements in tire trimming and buffing devices and the present application is a continuation in part of an application filed by me March 21, 1935, serially numbered 12,216.

In the above mentioned application is described a device for removing treads from rubber tires, which consists of a mounting for the tire by means of which it is rotated and a plurality of cutting or shredding members which are rotatably mounted and adapted for engagement with the outer surface of the tire to remove the tread therefrom.

In the before mentioned application, the cutters and tire mounting were so arranged that the cutting action takes place above the tire member, and the present application is directed to a device in which these elements are so arranged that the cutting action of the shredding members takes place beneath the tire which has certain advantages as will hereinafter appear.

Figure 2:
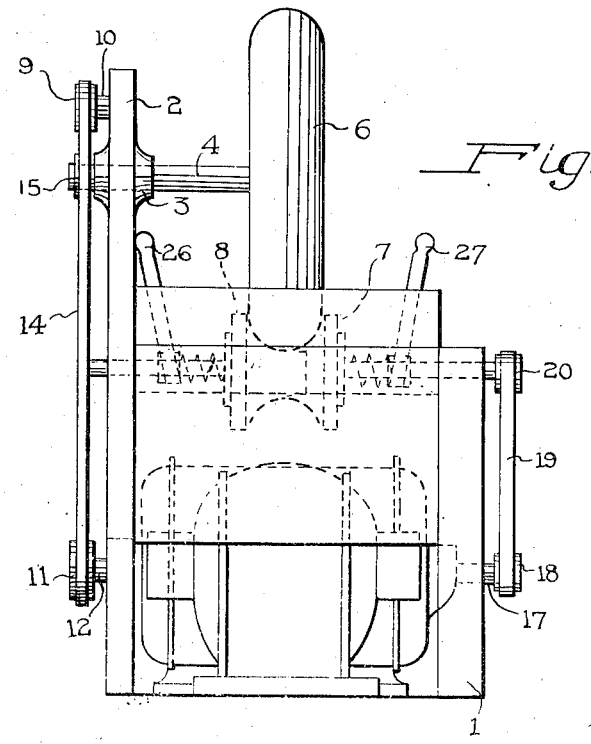
Figure 3:
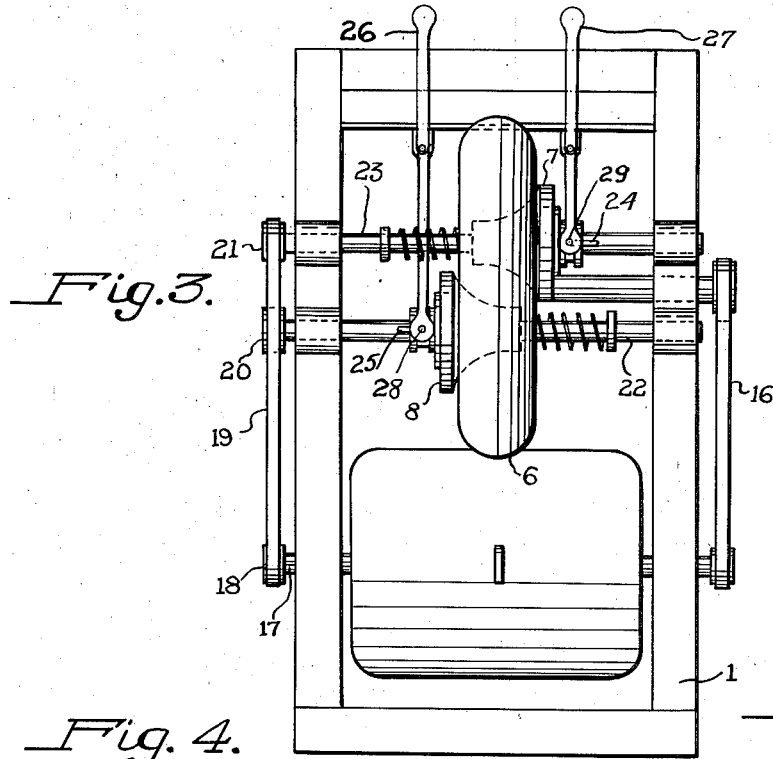

In the accompanying drawings constituting a part hereof and in which like reference characters designate like parts:

Fig. 1 is a side elevational view of a tire trimming device embodying the principles of this invention;

Fig. 2 a front elevational view thereof;

Fig. 3 a plan view; and

Figure 4:
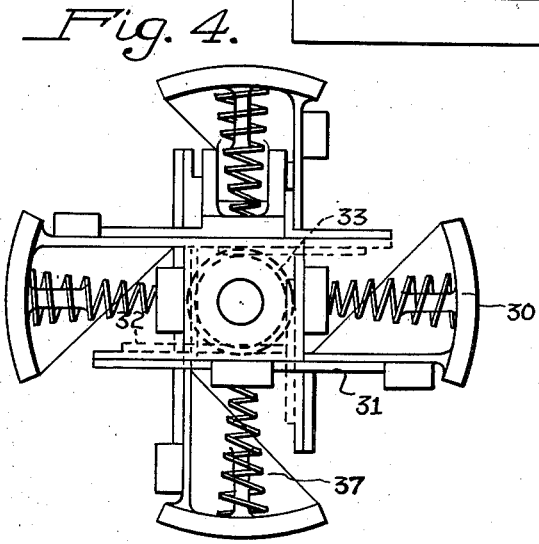
Figure 5:
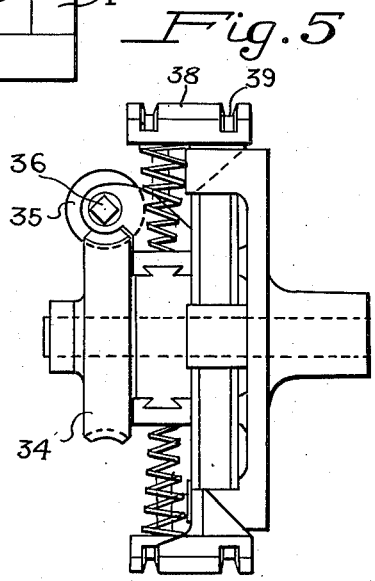

Figs. 4 and 5 side and front elevational views respectively of a tire mounting chuck.

With reference to the several figures of the drawings, the structure therein illustrated comprises a machine frame 1 having a vertical column or upright 2 with a journal bearing 3 slidably mounted therein for receiving a shaft or spindle 4 on which the tire chuck shown in Figs. 4 and 5 is mounted. The journal block 3 is movable vertically in a slot 5 of the upright to adjust the tire 6 mounted on the chuck relative to a plurality of shredding or cutter members 7 and 8. A sprocket wheel 9 is journalled on a stud shaft 10 secured in the top of the upright 2 and a similar sprocket 11 extends beyond the frame 2 and is actuated by a shaft 12 of a speed reducer mechanism 13. A sprocket chain 14 engages the sprocket wheels 9 and 11 and also a sprocket wheel 15 which is mounted on the end of the tire shaft 4 and which maintains constant mesh with the chain 14 within the limits of the slot 5. The transmission mechanism 13 is actuated by a chain drive 16 connected to a motor shaft 17, which is also provided with a sprocket wheel 18 having connection with a chain 19 that passes around a pair of sprocket wheels 20 and 21 of shafts 22 and 23, respectively, on which the cutter heads 7 and 8 are mounted.

As shown in Fig. 3, cutter heads 7 and 8 have a spline connection with their supporting shafts and spline keys 24 and 25 engaging slots in the cutter heads to render the latter axially movable on shafts 22 and 23. Levers 26 and 27 engaging trunnions 28 and 29 of the cutter heads 7 and 8 subject the cutter heads to axial movement to bring them in cutting engagement with the outer periphery of the tire 6. The mounting for the tire is shown in Figs. 4 and 5 of the drawings and consists of a plurality of movable clamping jaws 30 disposed in guides 31 and having extensions 32 provided with gear teeth constituting the extension gear racks, which interact with the teeth of a gear wheel 33 common to all of the racks of the jaws 30. Rotation of wheel 33 simultaneously subjects all of the jaws to radial movement and the gear wheel 33 is actuated through a worm gear 34 interacting with a worm 35 that is rotated by a crank fitted on the end of a square shank 36. The jaws 30 are each provided with a coil spring 37 which acts to normally bias the jaws radially outwardly, and the outer faces 38 of the jaws are grooved as shown at 39 to receive the edges of the tire or shoe. The chuck is preferably adjustable over a range of sizes to take in commercial sizes of tires to be shredded, thus requiring a minimum investment in equipment and machine parts.

The operation of the above described apparatus is briefly as follows:

The tire to be shredded or trimmed is mounted on the chuck element of Figs. 4 and 5 by engaging the jaws 30 with the inner periphery therof and when mounted as shown in Fig. 1, the tire is adjusted relative to the shredding or trimming heads 7 and 8. The drive motor is then energized, which simultaneously actuates the tire and cutter heads, causing them to rotate so that the periphery of the tire will move in a direction opposite to the direction of rotation of the cutter heads.

By manipulating levers 26 and 27, the cutter heads which are curved, as shown in Fig. 2, to substantially the contour of the tire periphery, will be brought into cutting engagement with the tire to remove the tread therefrom for the purpose of producing a raw, clean rubber surface upon which a new tread is subsequently vulcanized.

By the improved form of apparatus herein described, the cutters are located at a height where they are readily accessible for view and inspection of the operator and can be adjusted and removed with ease. Also, the waste material removed from the tire will be directed against a shield 26a or drawn into an exhaust member provided for the purpose, and will not be distributed over the machine parts. The mounting of the tire on the vertical standard above the cutter heads allows adjustment for different sizes of tires in a simple and expedient manner, while maintaining constant connection with the drive mechanism.

Although one embodiment of the invention has been herein illustrated and described, it will be apparent to those skilled in the art that various modifications may be made in the details of construction without departing from the principles herein set forth.

I claim:

1. Apparatus for trimming rubber tires comprising a vertically adjustable rotatable support for mounting the tire to be trimmed, a plurality of cutter heads shaped to the contour desired to be produced on the surface of the tire rotatably mounted beneath the tire support, a common drive mechanism for driving the tire and cutter heads in opposite directions, and means for moving the cutter heads from opposite sides into cutting engagement with the periphery of the tire.

2. Apparatus for trimming rubber tire treads comprising a tire gripping chuck having radial expansible gripping members, a plurality of cutter heads mounted beneath said chuck and being adapted for movement in a plane parallel with the axis of the chuck, said chuck being adapted for adjustment vertically relative to said cutter head and said cutter heads being movable toward each other and being of a shape to cooperate in forming the desired surface contour on the tire to be trimmed, and common drive means for subjecting the tire chuck and cutter heads to rotary movement.

3. In an apparatus for trimming rubber tires comprising a frame, a standard extending above the frame, a bearing block mounted in said standard and being adjustable vertically therein, a drive shaft journalled in said bearing block and having a tire gripping chuck mounted thereon, a drive for said shaft comprising a sprocket gear rotatably mounted at the top of the standard, a sprocket gear mounted below said first named gear, and a chain passing around said sprocket wheel mounted on the drive shaft and adapted to maintain contact with the drive chain for any adjusted position of the bearing block in the standard.

4. In a tire trimming apparatus, a supporting frame, a plurality of drive shafts journalled in said frame, cutter heads slidably mounted on said shafts and rotatable therewith, drive mechanism for said shafts comprising sprocket wheels mounted at the end of the shaft and having a common sprocket chain passing therearound whereby the shafts are simultaneously operated to rotate in the same direction, means for rotatably mounting a tire gripping chuck above said cutter heads, said means being adjustable vertically relative to the cutter heads, a drive mechanism for said chuck operable to rotate the chuck in a direction opposite to the direction of rotation of said cutter heads, and means for adjusting the cutter heads axially in their drive shafts to vary the cutting contact thereof with the tire mounted on the tire chuck.

JAMES A. GEORGE.